United States Patent [19]
Karadavidoff et al.

[11] 3,925,552

[45] Dec. 9, 1975

[54] PHARMACEUTICAL COMPOSITIONS CONTAINING 1-CARBOXAMIDINE PYROZOLES AND THEIR ACID ADDITION SALTS AND USE OF SAME

[75] Inventors: Isaac Karadavidoff; Michele Moreau, both of Paris, France

[73] Assignee: Fuveau S.A., Paris, France

[22] Filed: Sept. 26, 1973

[21] Appl. No.: 400,733

Related U.S. Application Data

[62] Division of Ser. No. 247,833, April 26, 1972, Pat. No. 3,833,605.

[52] U.S. Cl. ............................................. 424/273
[51] Int. Cl.² ...................................... A61K 31/415
[58] Field of Search ................................. 424/273

*Primary Examiner*—Stanley J. Friedman
*Attorney, Agent, or Firm*—Brooks Haidt Haffner & Delahunty

[57] ABSTRACT

Compounds of formula:

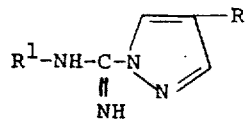

in which R represents a hydrogen atom or a lower alkyl group and $R^1$ represents a hydrogen atom, an alkyl or arylalkyl group and their therapeutic application as anti-inflammatory and analgesic agents, both R and R' not being hydrogen.

8 Claims, No Drawings

PHARMACEUTICAL COMPOSITIONS CONTAINING 1-CARBOXAMIDINE PYROZOLES AND THEIR ACID ADDITION SALTS AND USE OF SAME

This is a division of application Ser. No. 247,833, filed Apr. 26, 1972, now U.S. Pat. No. 3,833,605.

The present invention relates to new derivatives of pyrazole which have particularly favourable anti-inflammatory and analgesic activities.

The new products according to the invention are of the following general formula:

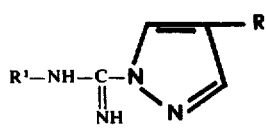

in which R represents hydrogen, or lower alkyl and $R^1$ represents hydrogen, an alkyl or arylalkyl, both R and $R^1$ not being hydrogen. The preferred alkyl group for $R^1$ is lower alkyl and the preferred arylalkyl group is benzyl, as shown hereinafter.

The addition salts of these derivatives with inorganic or organic acids which can be used therapeutically such as hydrochloric acid, citric acid, malic acid, oxalic acid are also the object of the invention.

The method for the preparation of the compounds of formula I is characterised in that a salt of aminoguanidine possibly substituted by the radical $R^1$ is condensed with 1,1,3,3 - tetraethoxy propane possibly substituted by the radical R. The raw materials are prepared in the customary manner according to methods described in the literature. The condensation stage is carried out in the presence of hydrochloric or hydriodic acid at approximately 40°C for 3 to 4 hours.

The new products are thus obtained in free form by introducing ammonia into the chloroformic solution of the salt obtained in the condensation reaction.

The following examples illustrate the method for the preparation of the compounds according to the invention.

EXAMPLE 1

Preparation of 1-carboxamidine pyrazole hydrochloride 306 ml of concentrated HCl is added dropwise to a solution of 245 g of aminoguanidine carbonate in 450 ml of water. By means of a water-bath it is then brought to 40°C and in 3 hours 396 g of 1,1,3,3 - tetraethoxy propane are added. When the addition is completed, carbon black is added and stirred for 10 mins. at 40°C. It is left in the cold for one night. The product crystallizes en masse; it is crushed, dried and washed with acetone. After drying, the 1-carboxamidine pyrazole hydrochloride (180 g) is obtained which is recrystallized several times in a minimal amount of water. MP: 170°–71°C.

Determination N (aminated): 9.56% (Calculated); 9.59% (found)

EXAMPLE 2

Preparation of N-methyl-1-carboxamidine-pyrazole hydrochloride 6.7 ml of 57% hydriodic acid in 3.3 ml of water is added to a solution of 10.8 g of 3-methyl 1-amino guanidine hydriodide in 15 ml of water. This is then brought to a temperature of 40°C and in 3 hours 11 g of 1,1,3,3 - tetraethoxy propane are added. The solution is evaporated in vacuo, the residue dissolved in water is alkalized by adding 10% soda and extracted with chloroform. Then after drying it is treated with ethyl chloride with a view to obtaining the desired hydrochloride which crystallizes at 0°C (yield 65%). MP: 161°C.

EXAMPLE 3

Preparation of N-benzyl-1-carboxamidine-pyrazole hydriodide 8.4 ml of 57% hydriodic acid in 10 ml of ethanol are added to a solution of 18.4 g 1-amino 3-benzyl guanidine hydriodide in 30 ml of water. Then, in 2 to 3 hours at 40°C 14 g of 1,1,3,3 - tetraethoxy propane are added.

The solution is evaporated to dryness and the residue is taken up in ether. The crystals obtained are dissolved in acetone and reprecipitated with ether.

11.35 g of the product is obtained (yield 55%) having a melting point of 170°C.

EXAMPLE 4

Synthesis of 4-butyl-1-carboxamidine-pyrazole hydrochloride

A solution of 6.8 g of aminoguanidine carbonate in 14 ml of water is treated with 8.5 ml of pure HCL.

This is brought to a temperature of 50°C and in 2 hours 13.8 g of 2-butyl 1,1,3,3-tetraethoxy propane are added. After standing for one night it is evaporated to dryness and taken up in acetone. By the addition of anhydrous ether crystals of the desired product are obtained (8 g; yield 80%); MP 139°C (recrystallized from isopropanol).

EXAMPLE 5

In a similar manner to Example 4, by adding 2-ethyl 1,1,3,3-tetraethoxy propane in place of 2-butyl 1,1,3,3-tetraethoxy propane, 4-ethyl pyrazole-carboxamidine -1 hydrochloride is obtained having a melting point of 119–120°C.

The pharmacological study of the compounds according to the invention has revealed favourable anti-inflammatory and analgesic properties.

1. Anti-inflammatory Activity:

a. Test of the carragheenin-induced oedema of a rat's paw (technique of Winter C.A. Proc. Soc. Exp. Biol. Med. 1962, 111,544).

The products of Examples 1,2,3,4 and 5 are administered per bone one hour before the injection of the carragheenin. The results are given in the subsequent Table I, in comparison with the results obtained with phenyl-butazone, used as a reference product.

TABLE I

| Product | Dose mg/kg per bone | Percentage of activity (decrease in the volume of the paw with respect to the control animal) | | | |
|---|---|---|---|---|---|
| | | 2hrs | 3hrs | 4hrs | 5hrs |
| phenylbutazone | 90 | 41.5 | 38 | 35 | 22 |
| of example 1 | 90 | 72 | 68 | 54 | 46 |
| of example 2 | 90 | 56 | 40 | 23 | 20 |
| of example 3 | 90 | 55 | 50 | 35 | 25 |
| of example 4 | 90 | 76 | 64 | 34 | 27 |
| of example 5 | 90 | 62 | 55 | 35 | 25 |

The products according to the invention have an anti-inflammatory activity greater than that of phenylbutazone both as regards intensity and duration.

b. Granuloma test: this test is carried out according to the method of Meier R and Coll (Experientia, 1950, 6, 469) The treatment is carried out firstly 6 hours before the test and then every 24 hours for the four subsequent days.

The difference between the wet weight of the granuloma and the dry weight gives the water content of the granulation tissue, the dry weight representing the anabolic activity. The percentage of activity is calculated on the wet weight.

By means of this test, the activity of the product of Example 1 is compared with the activity of two reference products: phenyl butazone and hydrocortisone acetate.

The results are given in the following Table II.

The product of Example I appreciably limits the development of the granuloma, whereas the phenyl butazone has only a negligible action.

TABLE II

| Product | Dose mg/kg | Wet weight | Dry weight | % humidity | % activity |
|---|---|---|---|---|---|
| Phenylbutazone | 0 | 439.4 | 90.3 | 79.3 | |
| | 90 | 400.1 | 82.9 | 79.2 | very low |
| Hydrocortisone Acetate | 0 | 446.6 | 93.7 | 78.8 | |
| | 15 | 237.5 | 63.3 | 73.2 | 46.8 |
| Pyrazole-carboxamidine −1 HCL | 90 | 340.7 | 81.4 | 75.9 | 23.7 |

2. Analgesic activity

It is shown by the analgesia test with acetic acid on mice (Koster R and Coll test, Ped Proc. 1959, 18, 412). The products are administered per bone in doses of 60 and 120 mg/kg and show an activity ranging from 35 to 80% (activity calculated by the reduction in the number of contorsions with respect to the control animal).

The compounds according to the invention are used as anti-inflammatory and analgesic agents in man, for example in the treatment of arthritis and various rheumatic conditions The total dose recommended is from 100 to 1000 mg every 24 hours depending on the chosen method of administration and the sensitivity of the patient.

The new compounds according to the invention are administered to the patients in the form of pharmaceutical compositions in which they are associated with an acceptable pharmaceutical medium, suitable for oral, rectal or parenteral administration, the unit dose of the active product being from 50 to 500 mg.

What is claimed is:

1. A pharmaceutical composition for use as an anti-inflammatory or analgesic agent which contains an effective amount of a compound of the formula:

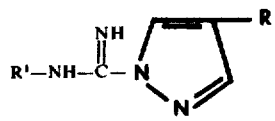

in which R is hydrogen or lower alkyl and $R^1$ is hydrogen, lower alkyl or benzyl, or an acid addition salt thereof, with a pharmaceutically acceptable inorganic or organic acid, and a pharmaceutically acceptable carrier.

2. A composition according to claim 1 wherein R is hydrogen and $R^1$ is methyl.

3. A composition according to claim 1 wherein R is hydrogen and $R^1$ is benzyl.

4. A composition according to claim 1 wherein R is butyl and $R^1$ is hydrogen.

5. A composition according to claim 1 wherein R is ethyl and $R^1$ is hydrogen.

6. A composition according to claim 1 wherein the composition is orally or rectally administrable and is in the form of a unit dose containing from 50 to 500 mg.

7. A composition according to claim 1 which is parenterally administrable and contains from 50 to 500 mg of the compound.

8. A method of treating an imflammatory condition which comprises administering to a patient a dose of a compound of the formula:

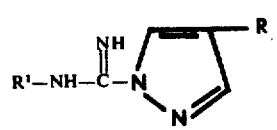

in which R is hydrogen or lower alkyl and $R^1$ is hydrogen, lower alkyl or benzyl, or an acid addition salt thereof, with a pharmaceutically acceptable inorganic or organic acid, in an amount of from 100 to 1,000 mg per day.

* * * * *

UNITED STATES PATENT OFFICE
CERTIFICATE OF CORRECTION

Patent No. 3,925,552     Dated December 9, 1975

Inventor(s) ISAAC KARADAVIDOFF ET AL

It is certified that error appears in the above-identified patent and that said Letters Patent are hereby corrected as shown below:

In the heading, after the line numbered "[62]" insert:

--[30] Foreign Application Priority Data

Apr. 30, 1971   France............71 15592

Mar. 8, 1972    France............72 07995--

Signed and Sealed this sixteenth Day of March 1976

[SEAL]

Attest:

RUTH C. MASON
*Attesting Officer*

C. MARSHALL DANN
*Commissioner of Patents and Trademarks*